(12) United States Patent
Tune

(10) Patent No.: US 8,291,244 B2
(45) Date of Patent: Oct. 16, 2012

(54) POWER MANAGEMENT IN A DATA PROCESSING DEVICE HAVING MASTERS AND SLAVES

(75) Inventor: Andrew Tune, Dronfield (GB)

(73) Assignee: ARM Limited, Cambridge (GB)

( * ) Notice: Subject to any disclaimer, the term of this patent is extended or adjusted under 35 U.S.C. 154(b) by 766 days.

(21) Appl. No.: 12/309,043

(22) PCT Filed: Jul. 28, 2006

(86) PCT No.: PCT/GB2006/002830
§ 371 (c)(1),
(2), (4) Date: Jan. 5, 2009

(87) PCT Pub. No.: WO2008/012483
PCT Pub. Date: Jan. 31, 2008

(65) Prior Publication Data
US 2009/0259861 A1  Oct. 15, 2009

(51) Int. Cl.
*G06F 1/32* (2006.01)
(52) U.S. Cl. .................... 713/320; 713/300; 713/310
(58) Field of Classification Search .............. 713/300, 713/310, 320
See application file for complete search history.

(56) References Cited

U.S. PATENT DOCUMENTS

| | | | | |
|---|---|---|---|---|
| 5,781,783 A * | 7/1998 | Gunther et al. | | 713/320 |
| 5,887,179 A * | 3/1999 | Halahmi et al. | | 713/324 |
| 6,892,313 B1 * | 5/2005 | Codilian et al. | | 713/323 |
| 6,983,389 B1 * | 1/2006 | Filippo | | 713/324 |
| 7,152,167 B2 * | 12/2006 | Kurts et al. | | 713/300 |
| 7,222,244 B2 * | 5/2007 | Kawahara et al. | | 713/300 |
| 7,802,116 B2 * | 9/2010 | Ravichandran | | 713/320 |
| 2003/0189868 A1 | 10/2003 | Riesenman et al. | | |
| 2004/0117670 A1 * | 6/2004 | Kurts et al. | | 713/300 |
| 2004/0221185 A1 * | 11/2004 | Bose et al. | | 713/300 |
| 2005/0044435 A1 * | 2/2005 | Zdravkovic | | 713/320 |
| 2005/0081067 A1 * | 4/2005 | Sperber et al. | | 713/300 |
| 2005/0251696 A1 * | 11/2005 | Cumpson et al. | | 713/300 |
| 2007/0136615 A1 * | 6/2007 | Son et al. | | 713/300 |
| 2009/0013201 A1 * | 1/2009 | He et al. | | 713/322 |
| 2009/0049318 A1 * | 2/2009 | Bose et al. | | 713/320 |

FOREIGN PATENT DOCUMENTS

| EP | 1 369 767 | 12/2003 |
|---|---|---|
| JP | 2002-300175 | 10/2002 |
| JP | 2004-363702 | 12/2004 |

(Continued)

OTHER PUBLICATIONS

International Search Report for PCT/GB2006/002830 mailed Apr. 23, 2007.

(Continued)

*Primary Examiner* — Kim Huynh
*Assistant Examiner* — Zahid Choudhury
(74) *Attorney, Agent, or Firm* — Nixon & Vanderhye P.C.

(57) ABSTRACT

A device, such as an integrated circuit is described including master units, and slave units connected by an interconnect. In addition to the normal data signals and address signals passed with a transaction, there are also passed usage signals which specify the time interval until a next transaction will be sent to a slave unit. A local slave power controller is responsive to such usage signals to switch into a low power mode and pre-emptively switch back to an operational mode in time to respond to the next transaction to be received.

50 Claims, 8 Drawing Sheets

FOREIGN PATENT DOCUMENTS

JP    2005 078146    3/2005

OTHER PUBLICATIONS

Written Opinion for PCT/GB2006/002830 mailed Apr. 23, 2007.
Lahiri et al., "Power Analysis of System-Level On-Chip Communication Architectures" [Online] Sep. 10, 2004, XP002428792.
English translation of Notice of Reasons for Rejection mailed Mar. 15, 2011 in JP 2009-521321.
Benini et al., "A Survey of Design Techniques for System-Level Dynamic Power Management", IEEE Transactions on Very Large Scale Integration (VLSI) Systems, vol. 8, No. 3, Jun. 2000, pp. 299-316.

* cited by examiner

| Usage Signals | Predicted Interval (# min·interval) |
|---|---|
| 000 | None → Stay Active |
| 001 | 1 |
| 010 | 2 |
| 011 | 4 |
| 100 | 8 |
| 101 | 16 |
| 110 | 32 |
| 111 | Indeterminate → Sleep |

POWER MANAGEMENT IN A DATA PROCESSING DEVICE HAVING MASTERS AND SLAVES

This application is the U.S. national phase of International Application No. PCT/GB2006/002830 filed 28 Jul. 2006 which designated the U.S., the entire contents of which are hereby incorporated by reference.

This technology relates to the field of data processing devices, and more particularly, to the management of power consumption within such devices.

Power consumption in system-on-chip integrated circuits and devices such as portable telephones and computers, is a major concern. Even in non-portable devices, reducing power dissipation is important because it reduces cost, simplifies the design of cooling, packaging and power supplies and increases reliability.

Known power management schemes fall into two main groups. The first and most common kind are heuristic power management policies, such as idle timeouts, for example turning off a display or turning down a CPU clock after some period of inactivity. The second kind are schemes that attempt to predict, using stochastic or Markov models, for example, when a device will not be used and suspend it. This type of scheme encompasses adaptive frequency and voltage scaling controlled at an operating system level.

A survey of known power management schemes can be found in "A Survey of Design Techniques For System Level Dynamic Power Management" by Luca Benini et al, IEEE Transactions On Very Large Scale Integration (VLSI) Systems, Volume 8, No. 3, June 2002.

A problem with all of the above schemes is that they tend to induce some power-delay trade off, i.e. they save power, but increase latency. The management of power in system-on-chip systems that contain many processing units and peripherals is particularly difficult. For example, a shared peripheral, such as a memory, might be used by a particular processor at a particular time interval, but might be required at low latency by another processor during that interval. Known schemes, such as the AMBA 3 AXI power management channel and the IEEE 802.11 wireless protocol, rely on a single power manager to resolve such system power issues. These centralized schemes do not scale well to larger systems. Integration of the power management signalling, which is routed differently to the main communication buses also represents an additional overhead and presents difficulties.

Viewed from one aspect the technology described herein provides a device for processing data comprising:
 one or more master units;
 one or more slave units; and
 an interconnect coupled to said one or more master units and said one or more slave units so as to route transactions, including data transfer transactions, along a wired path between said one or more master units and said one or more slave units; wherein
 a transaction received by at least one of said one or more slave units includes one or more usage signals specifying a usage prediction indicative of when a next transaction will be sent to said at least one of said one or more slave units; and
 said at least one of said one or more slave units has a local slave power controller responsive to said one or more usage signals to switch said at least one of said one or more slave units to a first slave power state for an interval before said next transaction is expected to be received and to switch said at least one of said one or more slave units to a second slave power state in time to service said next transaction, said first slave power state having a lower power consumption than said second slave power state and said first slave power state having a response latency longer than said second slave power state.

The present technique attempts to manage power with a reduced power-delay trade off by enabling a substantially precise indication of the period for which a device will be inactive to be signalled at a micro-architectural level. This removes the requirement for complex and imprecise heuristic and/or predictive models. The present technique delegates power management to the individual slaves and masters. It is readily scalable since it does not require an associated complex central power controller.

In preferred embodiments the power management signals can be routed together with the other communication signals to ease implementation and scalability, although more generally the usage signals could have their own separated routing/bus. The wired path could be a combined bus with various signals routed together or several separate buses with their own routing. Incorporating the power management signalling as part of the standard communication aids scalability.

The usage signals can be generated or modified (arbitrated) at different points between a transaction being initiated and the target for that transaction. One important source of usage signals is a master unit issuing a transaction since the master unit would likely be able to accurately identify when it was next to issue a transaction to that slave and accordingly incorporate appropriate usage signals along with the transaction. Another appropriate point for inserting or modifying usage signals would be at the level of the interconnect, which would likely have information relating to the state of the device as a whole, e.g. due to arbitration decisions made within the interconnect it may be possible to determine that usage of a given slave would be unlikely to be repeated for a period longer than would be indicated by the master initiating that transaction.

The interconnect can in preferred embodiments provide the function of arbitrating between usage signals received with respective transactions from a plurality of master units to provide an arbitrated usage signal passed to the target slave device. The interconnect is in a position to take account of previous transactions to a slave and previous usage information as well as the information associated with a current transaction in determining what usage signals to pass to a target slave device.

The level of sophistication provided at a slave unit can vary and advantageously a slave unit will have a plurality of low power states with respective power consumptions and response latencies, typically the lower the power consumption then the higher the latency. Depending upon the interval before the next transaction is predicted to arrive, the slave unit can choose the appropriate power down mode to enter, e.g. it may not be worthwhile entering a very deep power down mode which takes a long time to enter and a long time to exit when the interval to the next transaction is short, but it might be worthwhile to simply stop the clock for that short period to save some power.

The local slave power controller, which can advantageously be shared by a plurality of slave units can also select the low power state in dependence upon the slave unit's current state as well as the interval to the next transaction, e.g. there may be some other state variable associated with the slave unit concerned, such as servicing some other activity unconnected with the particular transaction, which indicates that the slave unit is unable to power down to a particular low power mode which is indicated by the interval to the next transaction.

It will be appreciated that whilst the above is described and useful in terms of only one slave unit incorporating an appropriate focal slave power controller, the technique is readily scalable and advantageous in systems in which multiple slave units contain respective local slave power controllers responsive to the usage signals. Similarly, the technique is well suited to systems incorporating multiple appropriately configured master units for generating usage signals.

In accordance with a preferred technique at least one of said one or more slave units upon receipt of a transaction from one of said one or more master units issues an acknowledgement to said one of said one or more master units, said acknowledgement including one or more delay predicting signals indicative of when said at least one of said one or more slave units will complete said transaction to said one of said one or more master units, and said one of said one or more master units includes a local master power controller responsive to said one or more delayed predicting signals to switch said one of said one or more master units to a first master power state for an interval before completion of said transaction is expected and to switch said one of said one or more master units to a second master power state in time for completion of said transaction, said first master power state having a lower power consumption than said second master power state and said first master power state having a response latency longer than said second master power state.

The intelligent and deterministic powering down of slave units in accordance with usage signals can be extended backwards to the master units. An acknowledgement signal returned from a slave unit (possibly reusing the usage signal lines/connection) upon receipt of a transaction can indicate how long it will be before the slave unit is able to complete that transaction and accordingly there is the possibility for the master unit to enter a lower power mode pending completion of the transaction e.g. latency in servicing a memory fetch.

As well as being used to control the power mode of a master and a slave involved in a given transaction, the present technique and the usage signals can also serve to trigger one or more intervening circuits on a path between the slave and master to enter a reduced power consumption state. This may include portions of an interconnect where it is known that that portion will be dormant for a determined period as indicated by the usage signals. This can save further power.

The usage signals can represent the delays in a variety of different ways, but a useful trade off between the number of usage signals which need to be provided and the range of delays which can be represented is one where a logarithmic encoding is employed. The lowest non-zero value representable can be selected to correspond to the lowest effective inactivity interval of any of the slaves which may be communicated with as it would not be worthwhile communicating potential power down intervals smaller than the lowest such interval which was usable.

When the time until a next transaction is indeterminate, this can also be communicated by the usage signals and a local slave power controller can be responsive thereto to switch to a low power consumption mode if desired. It will be appreciated that some latency will be associated with such indeterminate time intervals since it will not be possible for the slave unit to preemptively power up in time for the next transaction.

The manner in which the sources of usage signals can select which usage signals to assert can vary. In one type of embodiment a usage-specifying register may be associated with the master unit and writable under software control with a value specifying which usage signals should be generated in association with transactions originating at that master unit. This gives a good deal of flexibility in the way in which the usage signals may be specified, but at the cost of requiring some software intervention. Such software programming of the usage values may be performed at power up or system initialisation.

As an alternative, or in addition to, the above use of a register to specify usage signals, usage signal values may also be encoded within program instructions executed on a processor serving as a master and initiating a transaction. Accordingly, each transaction can have its own usage signal associated with it which was determined at the time the software was written, such as automatically by the compiler, with a knowledge of when the next transaction to be initiated by that program would arise.

A still further alternative, or addition, would be where an operating system program monitoring parameters of the system, such as thread activity, would determine what usage values to specify and use an appropriate program instruction to associate such usage values with a transaction being issued to a slave.

In addition to transferring information regarding the interval to the next transaction, the usage signals can also be used to pass power commands, such as local shutdown, global shutdown, local sleep, global sleep, local clock stop, global clock stop, local clock speed specifying, global clock speed specifying, low operating voltage mode, low leakage mode, wakeup and/or interval extend. The usage signals are already routed through the interconnect and accordingly provide a convenient vehicle for passing such power commands around the system.

It will be appreciated that the present technique can be applied to devices having a wide variety of different forms. The technique is particularly well suited to use within integrated circuits or multi-chip modules, but is extendible to printed circuit boards carrying a plurality of connected integrated circuits, e.g. a particularly power hungry slave would be an off-chip memory and it might be desirable to power this down using the usage signal technique described above.

Whilst the interconnect could take many forms, including a dedicated connection between one master unit and one slave unit, such as between a processor core and a cache memory, the technique is extendible and particularly applicable in the environment of interconnects providing a more generic point-to-point connection, such as for example the AXI interconnect systems provided by ARM Limited of Cambridge, England.

Viewed from another aspect the technology described herein provides a method for processing data using one or more master units, one or more slave units and an interconnect coupled to said one or more master units and said one or more slave units so as to route transactions, including data transfer transactions, along a wired path between said one or more master units and said one or more slave units, said method comprising the steps of:

generating a transaction received by at least one of said one or more slave units, said transaction includes one or more usage signals specifying a usage prediction indicative of when a next transaction will be sent to said at least one of said one or more slave units; and in response to said one or more usage signals using a local slave power controller of said at least one of said one or more slave units to switch said at least one of said one or more slave units to a first slave power state for an interval before said next transaction is expected to be received and to switch said at least one of said one or more slave units to a second slave power state in time to service said next transaction, said first slave power state having a lower power consumption than said second slave power state and said first slave power state having a response latency longer than said second slave power state.

Viewed from a further aspect the technology described herein provides a device for processing data comprising:
one or more master unit means;
one or more slave unit means; and
an interconnect means coupled to said one or more master units and said one or more slave units so as to route transactions, including data transfer transactions, along a wired path between said one or more master unit means and said one or more slave unit means; wherein
a transaction received by at least one of said one or more slave unit means includes one or more usage signals specifying a usage prediction indicative of when a next transaction will be sent to said at least one of said one or more slave unit means; and
said at least one of said one or more slave nit means has a local slave power controller means responsive to said one or more usage signals to switch said at least one of said one or more slave unit means to a first slave power state for an interval before said next transaction is expected to be received and to switch said at least one of said one or more slave unit means to a second slave power state in time to service said next transaction, said first slave power state having a lower power consumption than said second slave power state and said first slave power state having a response latency longer than said second slave power state.

Viewed from a further aspect the technology described herein provides a slave unit for use within a device having one or more master units, one or more slave units and an interconnect coupled to said one or more master units and said one or more slave units so as to route transactions, including data transfer transactions, along a wired path between said one or more master units and said one or more slave units, a transaction to received by at least one of said one or more slave units including one or more usage signals specifying a usage prediction indicative of when a next transaction will be sent to said at least one of said one or more slave units, said slave unit comprising:
a local slave power controller responsive to said one or more usage signals to switch said at least one of said one or more slave units to a first slave power state for an interval before said next transaction is expected to be received and to switch said at least one of said one or more slave units to a second slave power state in time to service said next transaction, said first slave power state having a lower power consumption than said second slave power state and said first slave power state having a response latency longer than said second slave power state.

Viewed from a further aspect the technology described herein provides a master unit for use within a device having one or more master units, one or more slave units and an interconnect coupled to said one or more master units and said one or more slave units so as to route transactions, including data transfer transactions, along a wired path between said one or more master units and said one or more slave units, said master unit comprising:
a transaction generator configured to generate a transaction to be received by at least one of said one or more slave units and including one or more usage signals specifying a usage prediction indicative of when a next transaction will be sent to said at least one of said one or more slave units.

Viewed from a further aspect the technology described herein provides an interconnect for use within a device having one or more master units, one or more slave units and an interconnect coupled to said one or more master units and said one or more slave units so as to route transactions, including data transfer transactions, along a wired path between said one or more master units and said one or more slave units, said interconnect comprising:
a signal connection configured to pass a transaction to be received by at least one of said one or more slave units and including one or more usage signals specifying a usage prediction indicative of when a next transaction will be sent to said at least one of said one or more slave units.

FIG. 1 schematically illustrates a device utilising power management techniques;

FIG. 2 schematically illustrates parallel signals passed via an interconnect in association with a transaction between a master and a slave;

FIG. 3 schematically illustrates one example encoding of usage signals;

FIG. 4 schematically illustrates a slave unit incorporating a local slave power controller;

FIG. 5 schematically illustrates a local slave power controller;

FIG. 6 is a flow diagram schematically illustrating the operation of a local slave power controller;

FIG. 7 schematically illustrates a master unit incorporating a local master power controller;

Figure 1:
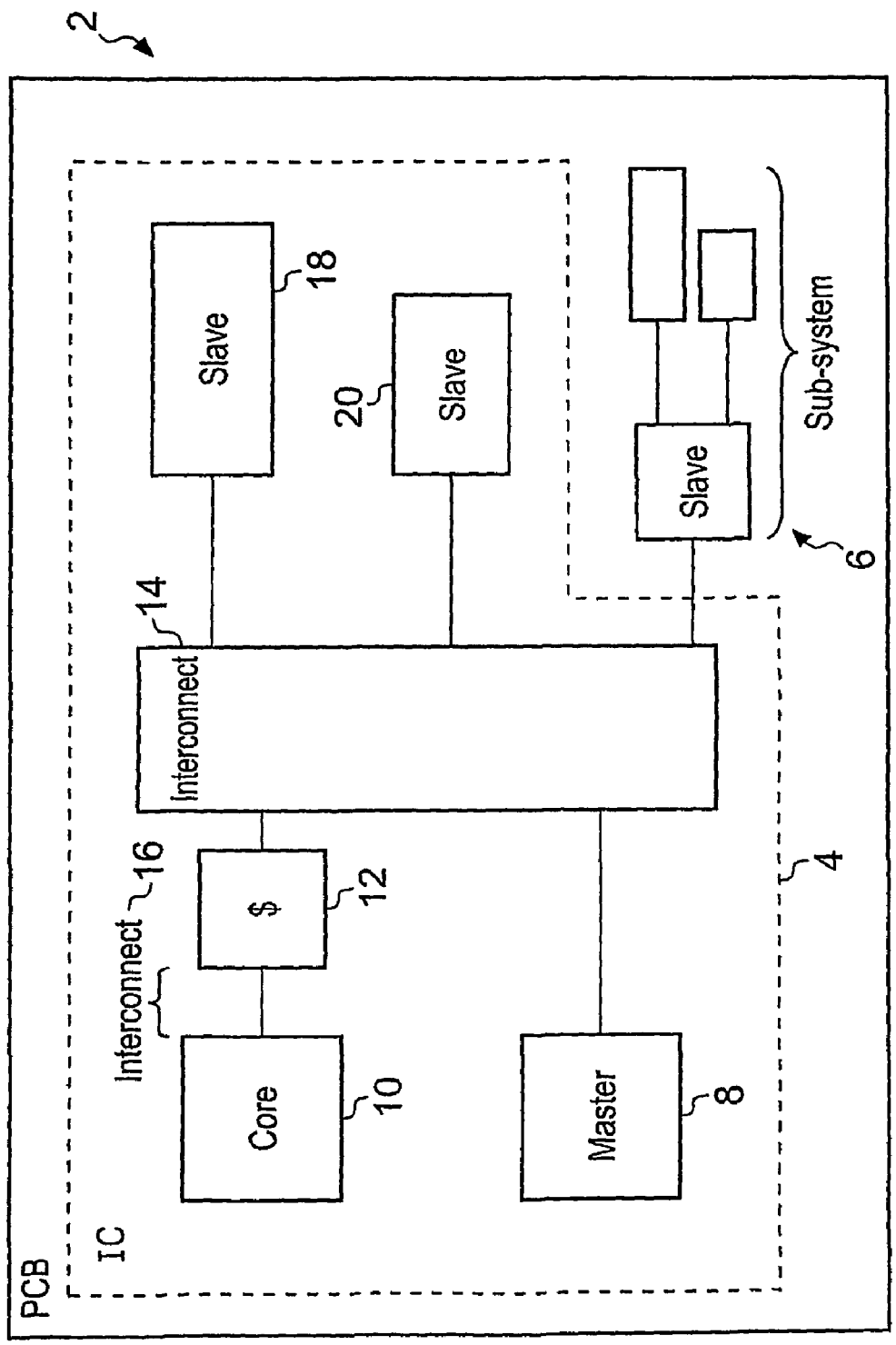

FIG. 1 shows a device 2 in the form of a printed circuit board incorporating an integrated circuit 4 and a slave sub-system 6. The integrated circuit 4 may be a multi-chip module, a system-on-chip integrated circuit or a standard integrated circuit. The integrated circuit incorporates a master unit 8, a processor core 10, which also serves as a master, and a cache memory 12 coupled to the processor core 10. The cache memory 12 serves as a slave to the processor core 10 and also as a master to an interconnect 14. Between the processor core 10 and the cache memory 12 there is a dedicated interconnect 16 which passes usage signals in accordance with the present technique as described below. The interconnect 14 is in this example embodiment a modified form of a AXI interconnect incorporating point-to-point connectivity and arbitration functions for such connections in accordance with the known AXI techniques. The interconnect 14 is extended beyond this known functionality by the provision of usage signals in accordance with the present technique which pass an indication of when a slave unit, such as one of the slaves 18, 20, 6 will receive its next transaction. The slave sub-system 6 acts as a slave relative to the interconnect 14, but in itself has more than one associated functional element which may be used, or not used, depending upon the transaction concerned and require further signal routing. The slave subsystem 6 could be a memory system with some local memory and additionally some higher order memory, such as a hard disk drive which would be required when the local memory could not service a particular transaction.

Figures 2, 3:
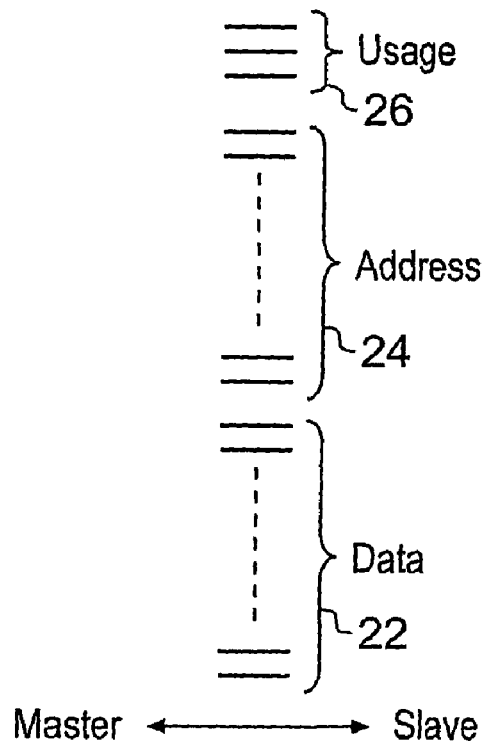

FIG. 2 schematically illustrates signals forming part of a transaction passed by the interconnect 14. These signals include data signals 22, address signals 24 and usage signals 26. The address signals 24 and the data signals 22 can be in accordance with the known AXI systems and protocols and may be routed (separately or together) and arbitrated between in accordance with these known system protocols. The usage signals 26 are added to this transaction and can follow the same routing so as to be subject to the same routing arbitration and delays. The usage signals 26 may alternatively be provided separately with their own routing and arbitration. The usage signals 26 pass information specifying, when this is known, when the next transaction originating from that master and passing to the target slave unit will occur. This information can be used by the slave to power itself down to an appropriate power down mode and preemptively power itself back up in time to service that next transaction without incurring disadvantageous latency.

FIG. 3 schematically illustrates one example encoding which may be used for example 3-bit usage signals. This encoding is logarithmic for all but the first and last values. The first value specifies no predicted interval and indicates that the slave should stay active. The last encoding represents an indeterminate interval and may be interpreted by the slave in a variety of different ways, such as initiating a sleep mode with no pre-emptive power up. In between these extremes, the encoding represents the interval to the next transaction, expressed in terms of a multiple of the minimum supported power down interval, such as four clock cycles in the case of a typical AXI interconnect implementation. There is no need to provide a granularity smaller than this smallest interval.

Figure 4:
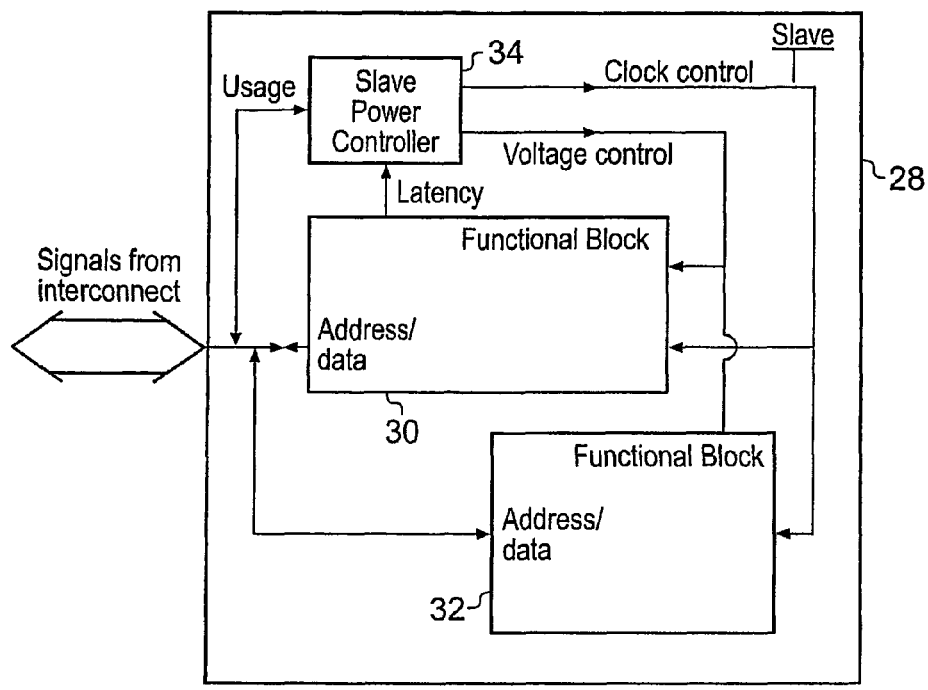

FIG. 4 schematically illustrates a slave unit 28. This incorporates a number of functional blocks 30, 32 which process the transaction received in accordance with the functionality provided by that slave unit 28 and in substantially the normal way as expected for an AXI transaction. In addition, a local slave power controller 34 is provided which is responsive to the usage signals and state information passed from functional block 30 to determine whether it is appropriate to enter one of a plurality of power down modes subsequent to servicing a received transaction, and for how long that power down mode should be entered. If the slave unit 28 is to be powered down, then appropriate clock control signals and/or voltage control signals are supplied to the function blocks 30, 32 to initiate this power down and subsequently initiate a pre-emptive power up. A local slave power controller 34 may also be shared by a plurality of slave units.

Figure 5:
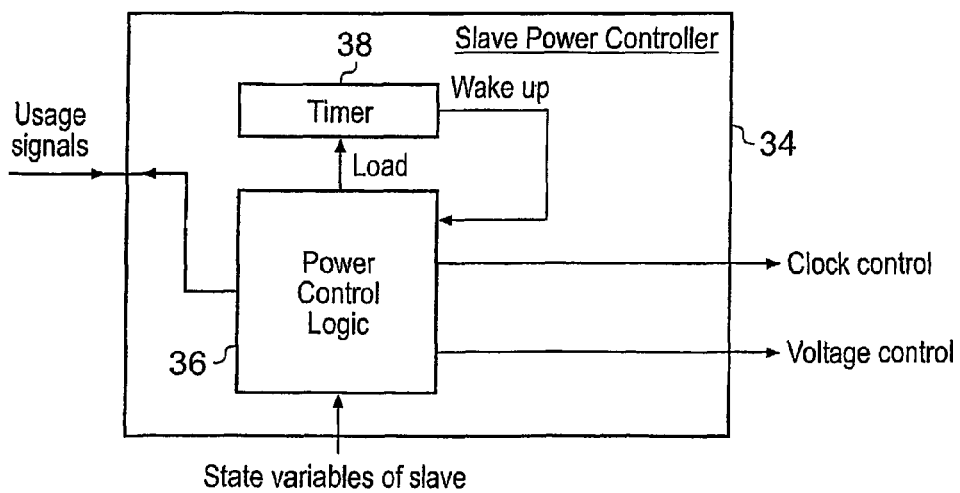

FIG. 5 schematically illustrates the local slave power controller 34 in more detail. The usage signals are supplied to power control logic 36 together with state variables representing one or more aspects of the current state of the slave unit 28. These signals in combination are used to determine into which powered down mode the slave unit 28 should be placed and for what time period. In accordance with this, an appropriate timer value is loaded into a timer 38 which then counts down the passage of time (e.g. in units of the minimum power down interval) until the pre-emptive wakeup is required and then generates a wakeup signal which is passed to the power control logic 36. The clock control signals and the voltage control signals generated by the power control logic 36 to enter the appropriate power down mode can have a variety of different effects. The clock signal could be stopped or slowed to a different value. The voltage could be lowered or switched off. The system could be placed into a low leakage mode or some other voltage manipulation performed to reduce power. Various power down modes are known and of any these could be used.

Figure 6:
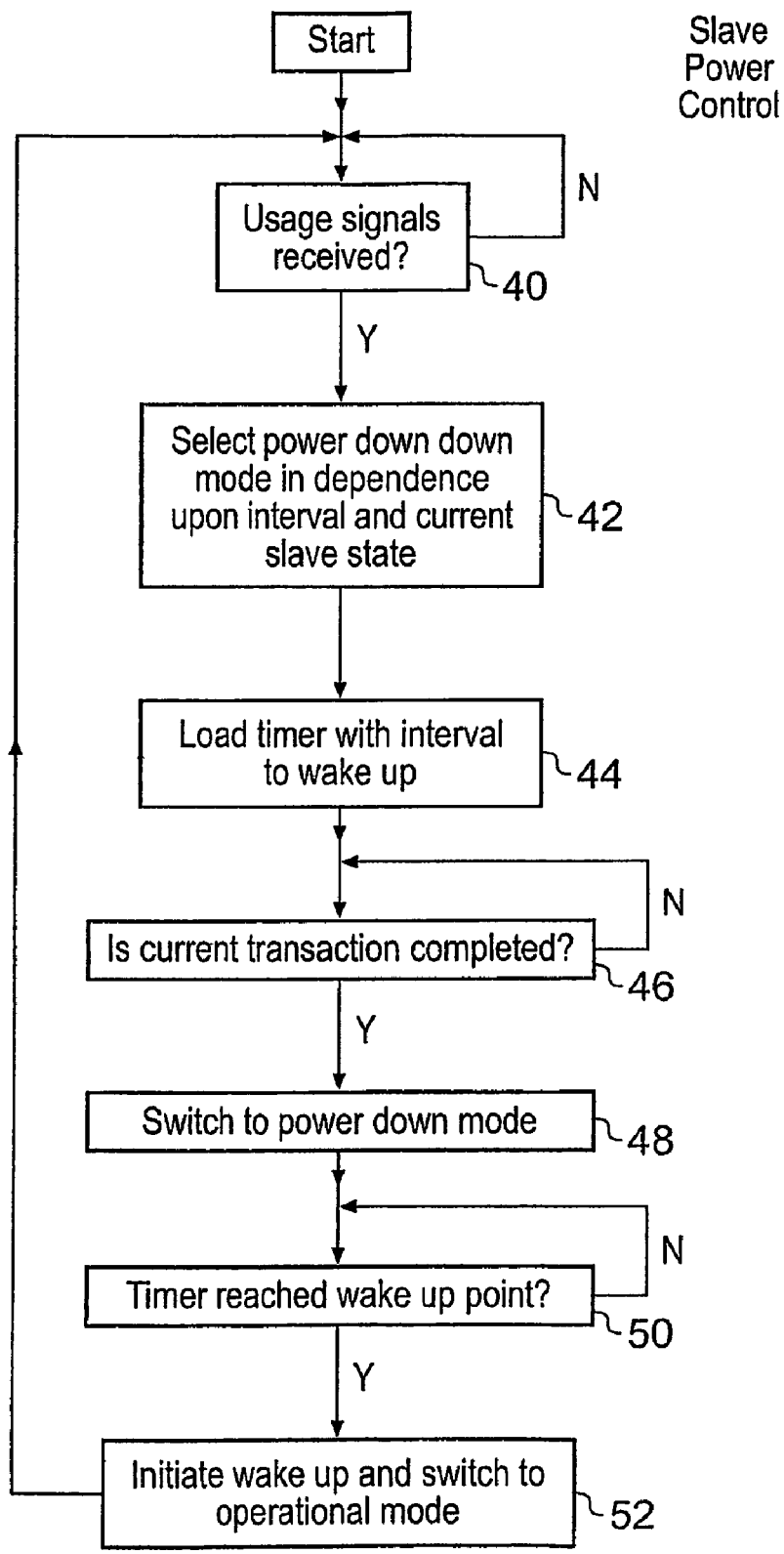

FIG. 6 is a flow diagram schematically illustrating the control performed by the power control logic 36. At step 40 the system waits for usage signals to be received. When such signals are received, processing at step 42 selects the power down mode to be entered depending upon the length of the interval until the next transaction and the current slave state. If the interval is short, then it may not be worthwhile entering a deep power down mode, which takes a large amount of time to enter and exit. Similarly, the current state of the slave unit 28 may place limitations on the power down modes which may be entered (signalled by its state variables) independently of the interval indicated. When the power down mode has been selected, then the wakeup time can be determined. Different power down modes will require different longer amounts of time to exit and accordingly require the wakeup to occur earlier or later. At step 44, the timer 38 is loaded with the interval to the required wakeup point. Step 46 then checks whether the current transaction, which accompanied the usage signals which were detected at step 40, has completed. When this transaction has completed, processing proceeds to step 48 at which the signals for controlling the clock and voltage appropriate to the selected power down mode are issued and the slave unit is switched into that power down mode. Step 50 continuously checks whether the timer has reached the required wakeup point. When the wakeup point is reached, then processing proceeds to step 52 at which the wakeup is initiated and the power control logic 36 issues the appropriate clock control and voltage control signals to move the slave unit 28 back to its operational mode in which it is able to respond to the next transaction. The aim of the power control logic 36 will be to move the slave unit 28 back to its operational mode so that it is ready for the next transaction just in time for that next transaction to be received.

Although not illustrated in FIG. 6, the slave unit 28 may utilise the usage signals to send back an acknowledgement to the initiating master indicating how long it will be before the slave unit 28 is able to complete the just received transaction. This acknowledgement signal is used by the master to power itself down if appropriate pending receipt of the completed transaction with the master unit powering itself up preemptively in time to receive the completed transaction.

Figure 7:
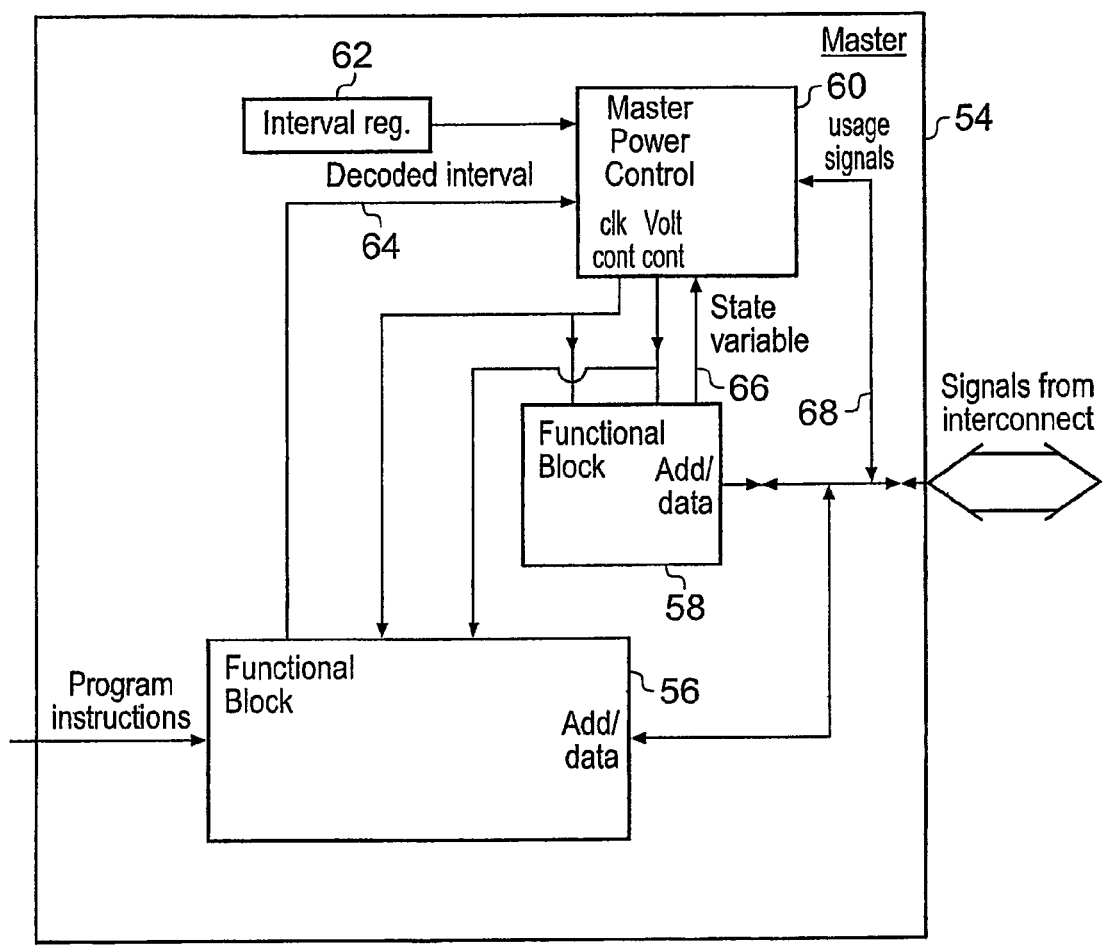

FIG. 7 schematically illustrates a master unit 54. The master unit 54 incorporates one or more functional blocks 56, 58 generating transactions, such as AXI transactions, in substantially the known way and being responsive to program instructions if they are programmable. Also, provided within the master unit 54 is a local master power controller 60. The local master power controller 60 is responsive to one or more of a software writable interval value stored within an interval register 62; decoded signals from a field within a program instruction giving a decoded interval on signal line 64; and state variable signals 66 specifying the current state of the master unit 54, in determining what usage signals 68 to issue in association with a transaction sent out from the master unit 54 to a slave-unit. The usage signals will specify when the master unit 54 expects it will next initiate a transaction to that slave. This indicated usage signal value is determined at a micro-architectural level within the master unit 54 itself and so will tend to be relatively accurate, although this cannot be absolutely guaranteed, e.g. due to the occurrence of unexpected interrupts.

The local master power controller 60 is also responsive to acknowledgement signals passed back from a slave via the usage signal lines 68 to power down the master unit 54 when the slave indicates that it will not be completing a transaction, e.g. returning requested data, for a period justifying entry and exit from a power down mode. The local master power controller accordingly generates clock control signals and voltage control signals which are passed to the functional blocks 56, 58 to enter power down modes within the master 54.

Figure 8:
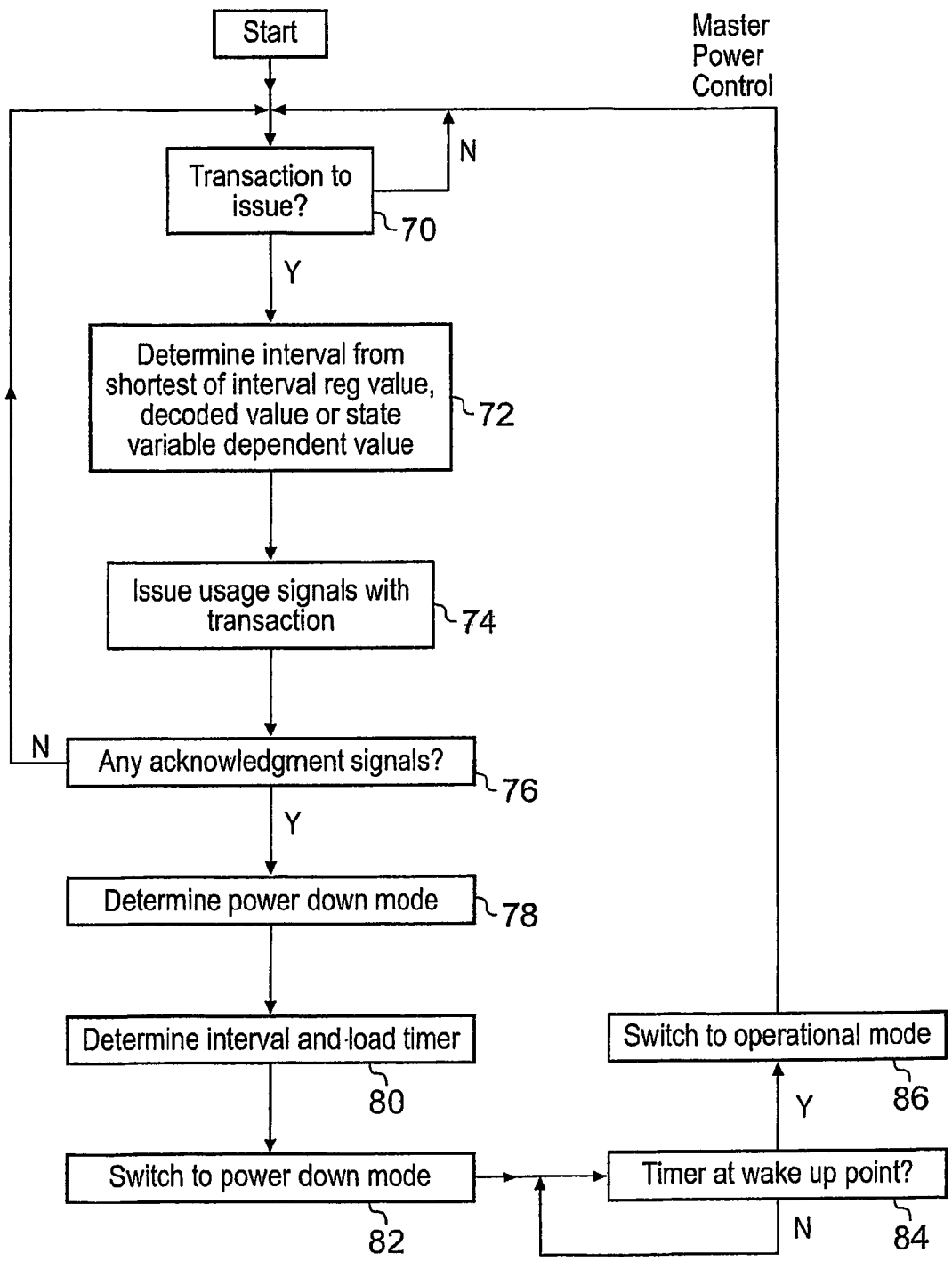
FIG. 8 is a flow diagram schematically illustrating the operation of a local master power controller.

FIG. 8 schematically illustrates the control performed by the local master power controller 60. At step 70 the processing waits for a transaction needing to be issued. When a transaction is to be issued, then step 72 determines the interval to be specified in the usage signals which will accompany that transaction from the shortest of the interval specified by the interval register value within the register 62; the decoded interval from any program instruction on the decoded interval signal lines 64; and in dependence upon any constraint specified by the state variables on the state variable signal line 66. When this determination is complete, step 74 issues the usage signals on signal lines 68 together with a transaction. Step 76 waits for any acknowledgement signals which might be passed back from the slave indicating how long it will be before the slave is able to complete the transaction. If such acknowledgement signals are received, then processing passes to step 78 where a determination of the power down mode to be employed is made as selected from a plurality of power down modes which might be supported by the particular master unit 54, e.g. clock stopping, clock slowing, low voltage, low leakage, sleep, power down, data retention etc. At step 80, the interval to the required wakeup time associated with the power down mode to be used is determined and loaded into a timer within the local master power controller 60. At step 82, the local master power controller 60 switches the master unit 54 into the power down mode. At step 84, the local master power controller 60 waits until the timer reaches a wakeup point at which time processing progresses to step 86 and the master unit 54 is switched back to its operation mode in time for the data to be returned or the transaction completed in some other way.

Figure 9:
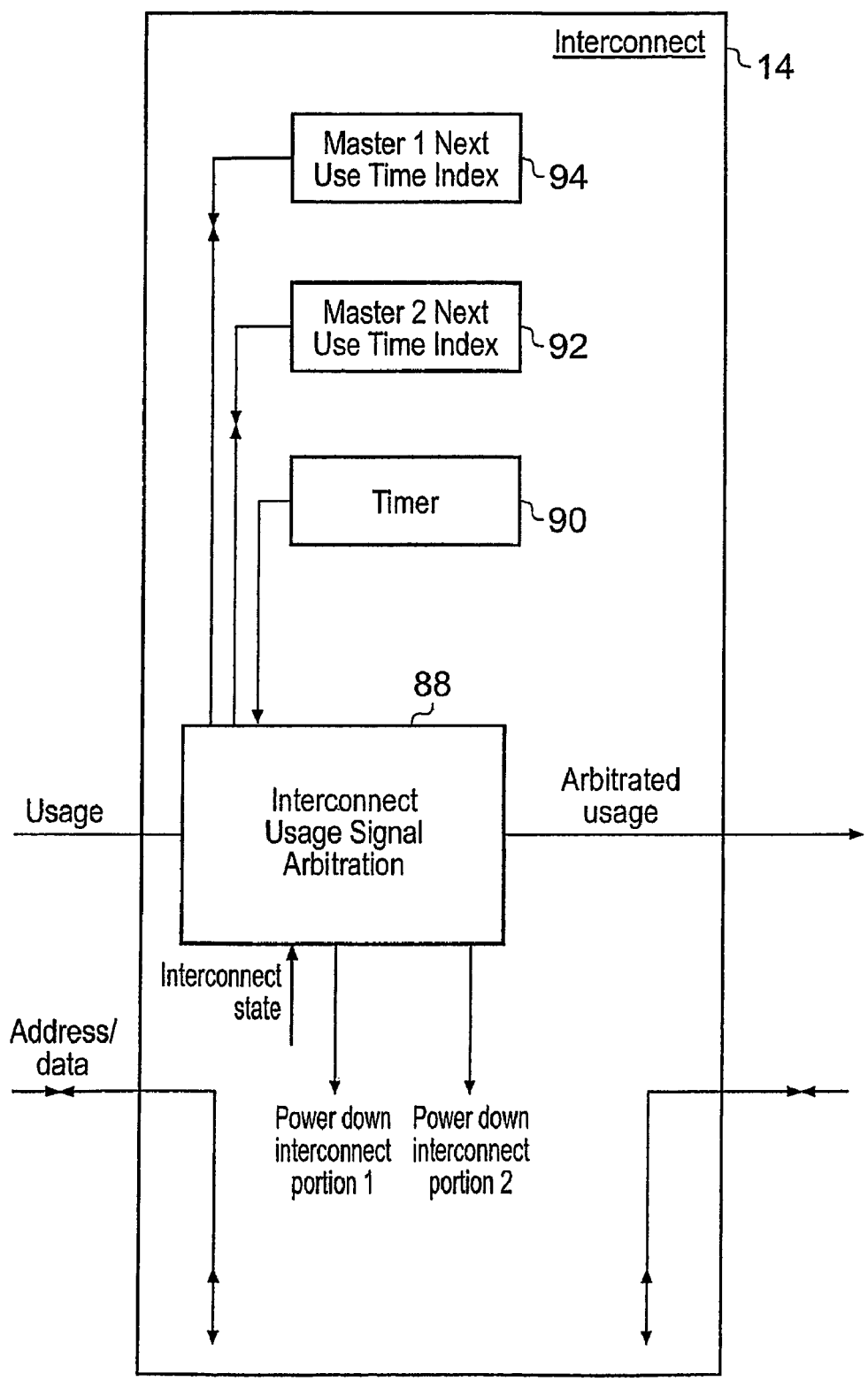
FIG. 9 is a diagram schematically illustrating an interconnect incorporating a usage signal arbitration function.

FIG. 9 schematically illustrates an interconnect block 14 which may be used in accordance with the present technique. This interconnect block 14 supports the routing of address and data as well as control information in accordance with the known AXI techniques, or other techniques. The elements included within the interconnect 14 to support these known functions are not described herein further as they will be familiar to those in this technical field. The interconnect 14 in addition to its normal elements includes an interconnect usage signal arbitration block 88 which serves to arbitrate usage signals passing through the interconnect 14 between masters and slaves. A timer 90 provides a time index value incrementing in minimum power down interval steps e.g. four clock cycles. When a usage signal is received in association with a transaction, a determination is made as to whether or not the stored time index values associated with the connected masters and indicating when those masters will next require the particular slave concerned indicate such a next usage before or after that indicated by the current received usage signal for the target slave unit. These stored time index values are held within registers 92 and 94. If the stored next usage requirement is prior to that indicated in the currently received usage signals, then the interconnect usage signal arbitration block 88 will modify the usage signal and replace the interval it specifies with a shorter interval as indicated by one of the stored next usage values within the registers 92, 94. If the next usage indicated by the current received usage signals is prior to any of those stored, then it will be passed on unaltered together with the transaction.

It will be appreciated that the arbitration between multiple masters is in this example performed within the interconnect 14. As an alternative, the arbitration could be performed within a slave unit itself, particularly if that slave unit was of a more complicated type, such as a memory controller, which was already designed and had systems provided for dealing with overlapping transactions from multiple masters.

The interconnect 14 in providing its data and address routing functions incorporates a variety of different portions, which can be selectively powered up and powered down in response to the usage signals passing through the interconnect 14. The interconnect block 14 can determine from the usage signals it is passing that a particular path will not be required for a certain period and accordingly it can power down that path whether that be parts of itself or additional parts outside of the interconnect block and not subject to their own local power control in response to usage signals passing therethrough.

Figure 10:
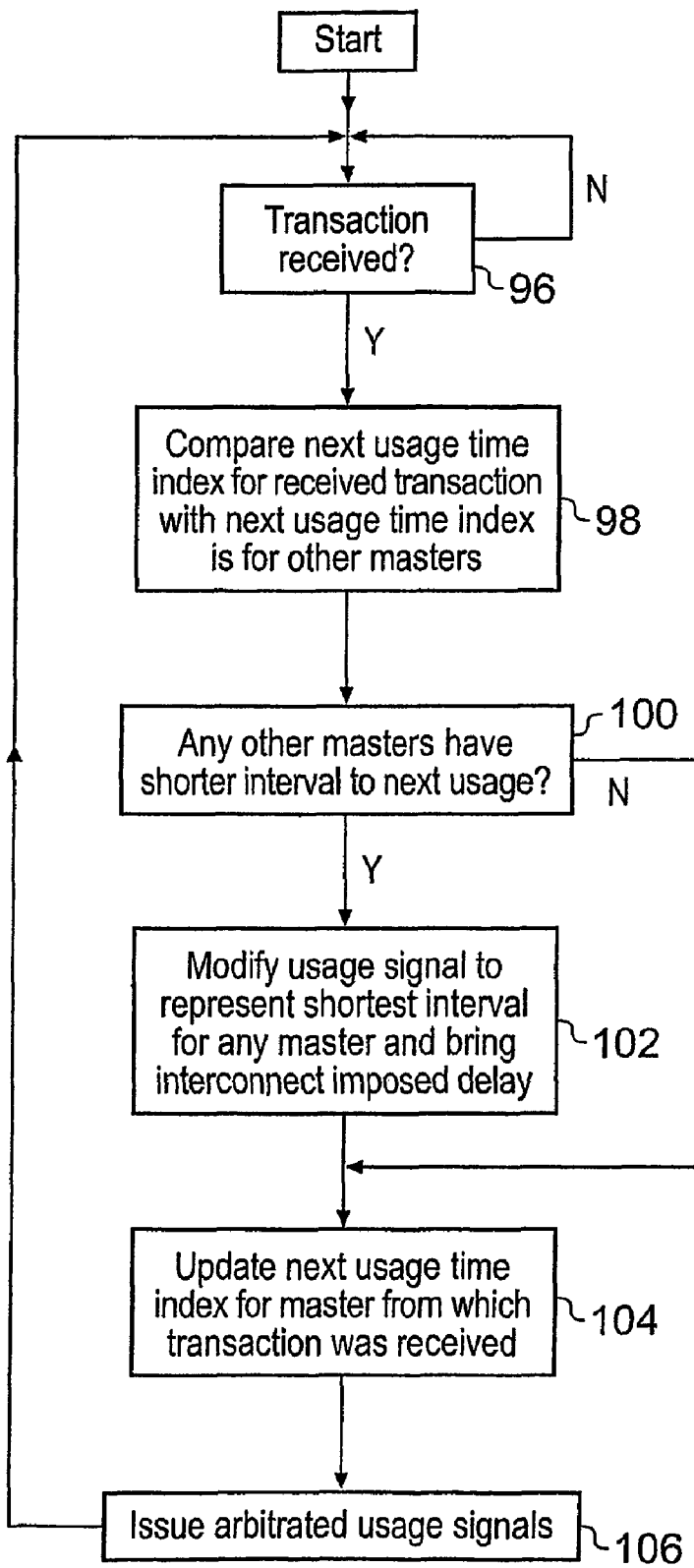
FIG. 10 is a flow diagram schematically illustrating usage signal arbitration.

FIG. 10 is a flow diagram schematically illustrating the arbitration performed by the interconnect usage signal arbitration block 88. At step 96 the interconnect usage signal arbitration block 88 waits for a transaction. When such a transaction is received, step 98 compares the next usage time derived from the usage signals concerned in the received transaction with the next usage time indexes for the other masters for previously received transactions from those other masters as stored within the registers 92, 94. Step 100 then determines whether any other masters have indicated a shorter interval to the next usage. If any other masters do have a shorter interval, then processing proceeds to step 102, which is otherwise by passed, at which the usage signals received are modified to instead represent the shortest interval for any of the masters of which the interconnect block 14 is aware and in response to any additional delay that may be imposed by the interconnect block 14 itself. The interconnect usage signal arbitration block 88 is responsive to state variable signals specifying the state of the interconnect block 14 and which can indicate factors such as that the data and address routing blocks operating in accordance with the known AXI techniques have allocated a particular pathway to some other element within the system and that this will impose a different time interval independent of all of the above until the next transaction will in fact be able to reach the slave unit concerned. At step 104, the next usage time index for the master from which the transaction was received is updated within the appropriate one of the registers 92, 94. At step 106 the arbitrated usage signals are issued on to the target slave unit.

It will be appreciated that the usage signals as well as specifying the time interval to the next transaction and being used to pass back acknowledgement signals indicating a time interval until the completion of a current transaction, they may also pass more standard power down commands which will then be conveniently and scalably routed through the system piggy-backing on the normal data and address routing infrastructure. Examples of such power down signals which can be supplied to the local slave power controllers, local master power controllers and the power controllers of the interconnect block itself include commands such as local shut down, global shutdown, local sleep, global sleep, local clock stop, global clock stop, local clock speed specifying, global clock speed specifying, low operating voltage mode, low leakage mode, wakeup and interval extend (this being a command to extend an already specified time interval until a next transaction or completion of a transaction).

The invention claimed is:

1. A device for processing data comprising:
   one or more master units;
   one or more slave units; and
   an interconnect, coupled to said one or more master units and said one or more slave units, configured to route transactions, including data transfer transactions, along a wired path between said one or more master units and said one or more slave units; wherein
   a transaction received by at least one of said one or more slave units includes one or more usage signals specifying a usage prediction indicating when a next transaction will be sent to said at least one of said one or more slave units; and
   said at least one of said one or more slave units has a local slave power controller responsive to said one or more usage signals to switch said at least one of said one or more slave units to a first slave power state for an interval before said next transaction is expected to be received and to switch said at least one of said one or more slave units to a second slave power state in time to service said next transaction, said first slave power state having a lower power consumption than said second slave power state and said first slave power state having a response latency longer than said second slave power state.

2. A device as claimed in claim 1, wherein a master unit issuing a transaction provides said one or more usage signals within said transaction in dependence upon a current state of said master unit.

3. A device as claimed in claim 1, wherein said interconnect provides said one or more usage signals within said transaction in dependence upon a current state of said device.

4. A device as claimed in claim 3, wherein said interconnect arbitrates between usage signals received with respective transactions from a plurality of master units to provide arbitrated usage signals passed to said at least one of said one or more slave units and indicative of when a next transaction will be sent to said at least one of said one or more slave units from any of said plurality of master units.

5. A device as claimed in claim 1, wherein said at least one of said one or more slave units has a plurality of low power states with respective power consumptions and response latencies that can be used as said first slave power state and said local slave power controller selects which one of said plurality of low power states to use as said first slave power state in dependence upon said interval before said next transaction is expected.

6. A device as claimed in claim 5, wherein said local slave power controller also selects which one of said plurality of low power states to use as said first slave power state in dependence upon a current state of said at least one of said one or more slave units.

7. A device as claimed in claim 1, comprising a plurality of slave units each including a local slave power controller responsive to said one or more usage signals.

8. A device as claimed in claim 1, wherein said one or more delay predicting signals also serve to trigger one or more intervening circuit elements on a path between said at least one of said one or more slave units and said one of said one or more master units to enter a reduced power consumption state.

9. A device as claimed in claim 1, wherein said interconnect includes:
   a plurality of portions with separately controllable power state; and
   a local interconnect power controller responsive to said one or more usage signals to control respective power states of said plurality of portions of said interconnect.

10. A device as claimed in claim 1, wherein said one or more usage signals comprise a plurality of usage signals and use a logarithmic encoding for at least some values of said usage prediction.

11. A device as claimed in claim 1, wherein a usage prediction corresponding to a lowest non-zero value represented by said one or more usage signals corresponds to a lowest effective inactivity interval for one of said one or more slave units.

12. A device as claimed in claim 1, wherein said one or more usage signals have a value indicating an indeterminate time before said next transaction and said local slave power controller is responsive thereto to switch said at least one of said one or more slave units to a low power consumption mode.

13. A device as claimed in claim 1, comprising at least one usage-specifying register associated with a respective one of said one or more master units and storing a software writable value specifying usage signals to be generated by said one of said one or more master units.

14. A device as claimed in claim 1, comprising a processor responsive to a program instruction to initiate one of said transactions, a field with said program instruction specifying a value for said one or more usage signals to be associated with said transaction.

15. A device as claimed in claim 14, wherein said program instruction is part of an operating system program and said field is varied in dependence upon a current state of at least a portion of said device as determined by said operating system program.

16. A device as claimed in claim 1, wherein said one or more usage signals can also pass one or more power commands.

17. A device as claimed in claim 16, wherein said one or more power commands include one or more of:
   local shutdown;
   global shutdown;
   local sleep;
   global sleep;
   local clock stop;
   global clock stop;
   local clock speed specifying;
   global clock speed specifying;
   low operating voltage mode;
   low leakage mode;
   wake up; and
   interval extend.

18. A device as claimed in claim 1, wherein said device is one of:
   an integrated circuit;
   a multi-chip module; and
   a printed circuit board carrying a plurality of connected integrated circuits.

19. A device as claimed in claim 1, wherein said interconnect is a point-to-point interconnect.

20. A device as claimed in claim 1, wherein said interconnect is a dedicated connection between one master unit and one slave unit.

21. A device as claimed in claim 20, wherein said one master unit is a processor core and said one slave unit is a cache memory.

22. A device as claimed in claim 1, wherein said usage signals are routed in a shared wired path with one or more other signals forming part of said transaction.

23. A device as claimed in claim 1, wherein said local power controller is shared by a plurality of slave units.

24. A method for processing data using one or more master units, one or more slave units and an interconnect coupled to said one or more master units and said one or more slave units configured to route transactions, including data transfer transactions, along a wired path between said one or more master units and said one or more slave units, said method comprising the steps of:
   generating a transaction received by at least one of said one or more slave units, said transaction includes one or more usage signals specifying a usage prediction indicating when a next transaction will be sent to said at least one of said one or more slave units; and
   in response to said one or more usage signals using a local slave power controller of said at least one of said one or more slave units to switch said at least one of said one or more slave units to a first slave power state for an interval before said next transaction is expected to be received and to switch said at least one of said one or more slave units to a second slave power state in time to service said next transaction, said first slave power state having a lower power consumption than said second slave power state and said first slave power state having a response latency longer than said second slave power state.

25. A method as claimed in claim 24, wherein said one or more usage signals within said transaction are provided by a master unit in dependence upon a current state of said master unit.

26. A method as claimed in claim 24, wherein said one or more usage signals within said transaction are provided by said interconnect in dependence upon a current state of said device.

27. A method as claimed in claim 26, comprising arbitrating with said interconnect between usage signals received with respective transactions from a plurality of master units to provide arbitrated usage signals passed to said at least one of said one or more slave units and indicative of when a next transaction will be sent to said at least one of said one or more slave units from any of said plurality of master units.

28. A method as claimed in claim 24, wherein said at least one of said one or more slave units has a plurality of low power states with respective power consumptions and response latencies that can be used as said first slave power state and said local slave power controller selects which one of said plurality of low power states to use as said first slave power state in dependence upon said interval before said next transaction is expected.

29. A method as claimed in claim 28, wherein said local slave power controller also selects which one of said plurality of low power states to use as said first slave power state in dependence upon a current state of said at least one of said one or more slave units.

30. A method as claimed in claim 24, wherein a plurality of slave units each including a local slave power controller are responsive to said one or more usage signals.

31. A method as claimed in claim 24, wherein said one or more delay predicting signals also serve to trigger one or more intervening circuit elements on a path between said at least one of said one or more slave units and said one of said one or more master units to enter a reduced power consumption state.

32. A method as claimed in claim 24, wherein said interconnect includes a plurality of portions with separately controllable power state, said method further comprising in response to said one or more usage signals using a local interconnect power controller of said interconnect to control respective power states of said plurality of portions of said interconnect.

33. A method as claimed in claim 24, wherein said one or more usage signals comprise a plurality of usage signals and use a logarithmic encoding for at least some values of said usage prediction.

34. A method as claimed in claim 24, wherein a usage prediction corresponding to a lowest non-zero value represented by said one or more usage signals corresponds to a lowest effective inactivity interval for one of said one or more slave units.

35. A method as claimed in claim 24, wherein said one or more usage signals have a value indicating an indeterminate time before said next transaction, said method further comprising in response to said value indicating an indeterminate time using said local slave power controller to switch said at least one of said one or more slave units to a low power consumption mode.

36. A method as claimed in claim 24, comprising storing under software control into at least one usage-specifying register associated with a respective one of said one or more master units a value specifying usage signals to be generated by said one of said one or more master units.

37. A method as claimed in claim 24, comprising in response to a program instruction executed by a processor initiating one of said transactions, a field with said program instruction specifying a value for said one or more usage signals to be associated with said transaction.

38. A method as claimed in claim 37, wherein said program instruction is part of an operating system program and said field is varied in dependence upon a current state of at least a portion of said device as determined by said operating system program.

39. A method as claimed in claim 24, wherein said one or more usage signals can also pass one or more power commands.

40. A method as claimed in claim 39, wherein said one or more power commands include one or more of:
   local shutdown;
   global shutdown;
   local sleep;
   global sleep;
   local clock stop;
   global clock stop;
   local clock speed specifying;
   global clock speed specifying;
   low operating voltage mode;
   low leakage mode;
   wake up; and
   interval extend.

41. A method as claimed in claim 24, wherein said method is performed within one of:
   an integrated circuit;
   a multi-chip module; and
   a printed circuit board carrying a plurality of connected integrated circuits.

42. A method as claimed in claim 24, wherein said interconnect is a point-to-point interconnect.

43. A method as claimed in claim 24, wherein said interconnect is a dedicated connection between one master unit and one slave unit.

44. A method as claimed in claim 43, wherein said one master unit is a processor core and said one slave unit is a cache memory.

45. A method as claimed in claim 24, wherein said usage signals are routed in a shared wired path with one or more other signals forming part of said transaction.

46. A method as claimed in claim 24, wherein said local power controller is shared by a plurality of slave units.

47. A device for processing data comprising:
   one or more master unit means for generating transactions;
   one or more slave unit means for receiving said transactions; and
   an interconnect means, coupled to said one or more master units and said one or more slave units, for routing one or more of said transactions, including data transfer transactions, along a wired path between said one or more master unit means and said one or more slave unit means; wherein
   a transaction received by at least one of said one or more slave unit means includes one or more usage signals specifying a usage prediction indicating when a next transaction will be sent to said at least one of said one or more slave unit means; and said at least one of said one or more slave unit means has a local slave power controller means responsive to said one or more usage signals to switch said at least one of said one or more slave unit means to a first slave power state for an interval before said next transaction is expected to be received and to switch said at least one of said one or more slave unit means to a second slave power state in time to service said next transaction, said first slave power state having a lower power consumption than said second slave power state and said first slave power state having a response latency longer than said second slave power state.

48. A slave unit for use within a device having one or more master units, one or more slave units and an interconnect coupled to said one or more master units and said one or more slave units so as to route transactions, including data transfer transactions, along a wired path between said one or more master units and said one or more slave units, a transaction to received by at least one of said one or more slave units including one or more usage signals specifying a usage prediction indicating when a next transaction will be sent to said at least one of said one or more slave units, said slave unit comprising:
  a local slave power controller responsive to said one or more usage signals to switch said at least one of said one or more slave units to a first slave power state for an interval before said next transaction is expected to be received and to switch said at least one of said one or more slave units to a second slave power state in time to service said next transaction, said first slave power state having a lower power consumption than said second slave power state and said first slave power state having a response latency longer than said second slave power state.

49. A device for processing data comprising:
  one or more master units;
  one or more slave units; and
  an interconnect coupled to said one or more master units and said one or more slave units so as to route transactions, including data transfer transactions, along a wired path between said one or more master units and said one or more slave units; wherein
  a transaction received by at least one of said one or more slave units includes one or more usage signals specifying a usage prediction indicative of when a next transaction will be sent to said at least one of said one or more slave units; and
  said at least one of said one or more slave units has a local slave power controller responsive to said one or more usage signals to switch said at least one of said one or more slave units to a first slave power state for an interval before said next transaction is expected to be received and to switch said at least one of said one or more slave units to a second slave power state in time to service said next transaction, said first slave power state having a lower power consumption than said second slave power state and said first slave power state having a response latency longer than said second slave power state, wherein
  at least one of said one or more slave units upon receipt of a transaction from one of said one or more master units issues an acknowledgement to said one of said one or more master units, said acknowledgement including one or more delay predicting signals indicative of when said at least one of said one or more slave units will complete said transaction to said one of said one or more master units, and
  said one of said one or more master units includes a local master power controller responsive to said one or more delayed predicting signals to switch said one of said one or more master units to a first master power state for an interval before completion of said transaction is expected and to switch said one of said one or more master units to a second master power state in time for completion of said transaction, said first master power state having a lower power consumption than said second master power state and said first master power state having a response latency longer than said second master power state.

50. A method for processing data using one or more master units, one or more slave units and an interconnect coupled to said one or more master units and said one or more slave units so as to route transactions, including data transfer transactions, along a wired path between said one or more master units and said one or more slave units, said method comprising the steps of:
  generating a transaction received by at least one of said one or more slave units, said transaction includes one or more usage signals specifying a usage prediction indicative of when a next transaction will be sent to said at least one of said one or more slave units; and
  in response to said one or more usage signals using a local slave power controller of said at least one of said one or more slave units to switch said at least one of said one or more slave units to a first slave power state for an interval before said next transaction is expected to be received and to switch said at least one of said one or more slave units to a second slave power state in time to service said next transaction, said first slave power state having a lower power consumption than said second slave power state and said first slave power state having a response latency longer than said second slave power state, wherein
  at least one of said one or more slave units upon receipt of a transaction from one of said one or more master units issues an acknowledgement to said one of said one or more master units, said acknowledgement including one or more delay predicting signals indicative of when said at least one of said one or more slave units will complete said transaction to said one of said one or more master units, and
  in responsive to said one or more delayed predicting signals using a local master power controller of said one of said one or more master units to switch said one of said one or more master units to a first master power state for an interval before completion of said transaction is expected and to switch said one of said one or more master units to a second master power state in time for completion of said transaction, said first master power state having a lower power consumption than said second master power state and said first master power state having a response latency longer than said second master power state.

* * * * *